Patented Sept. 18, 1945

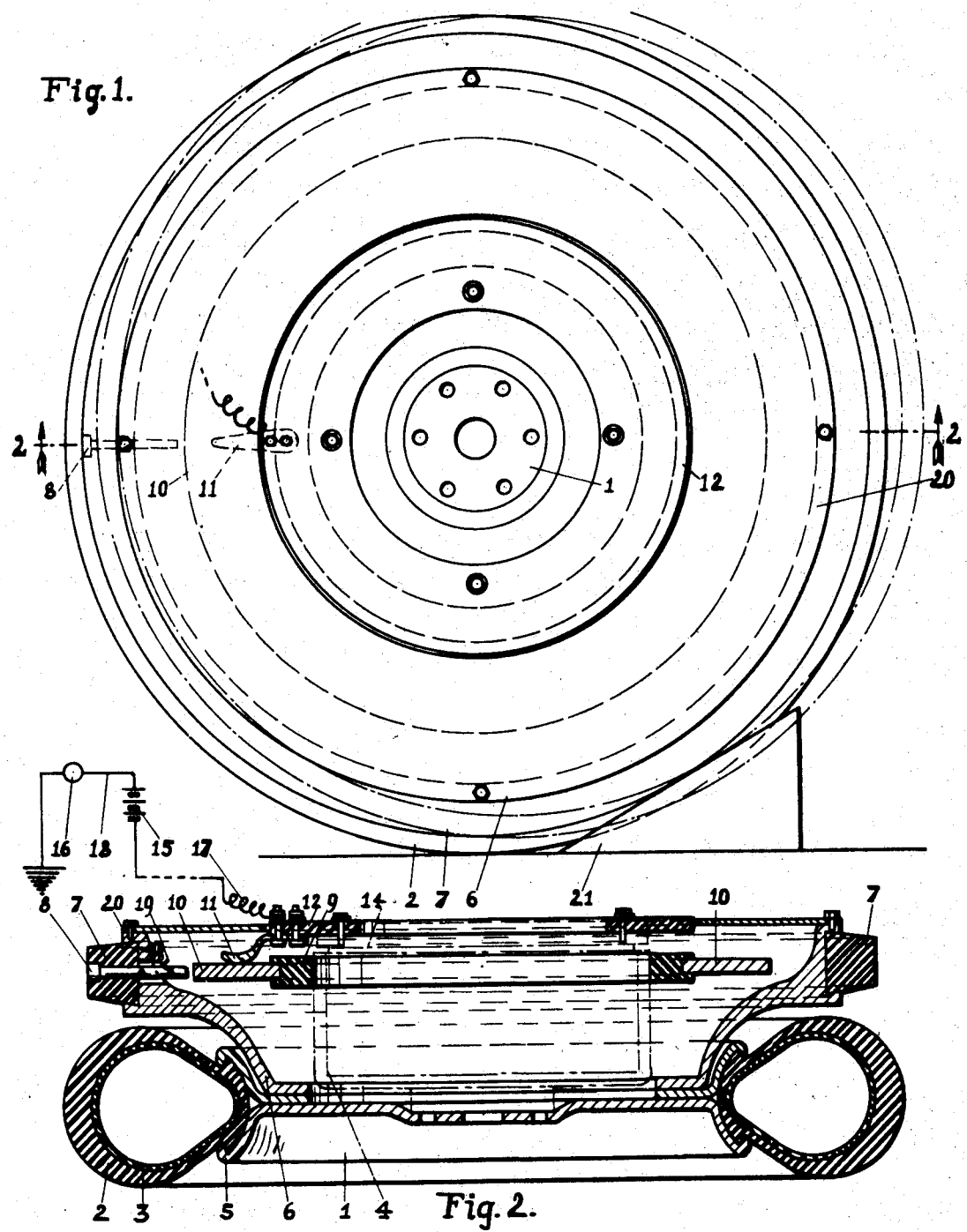

2,385,215

UNITED STATES PATENT OFFICE 2,385,215

SAFETY WHEEL

Alex Park MacDicken, Seattle, Wash.

Application December 30, 1944, Serial No. 570,705

1 Claim. (Cl. 177—311)

This invention relates to improvements in wheels which are provided with pneumatic tires, such as are used for automobiles, motorcycles, bicycles, aeroplanes, auto trailers and the like.

The main object of the present invention is the provision of a safety wheel which, upon a deflating of its pneumatic tire, will run on a solid tire so that accidents resulting from blow-outs will be avoided;

Another object of the present invention is the provision of a safety wheel which is provided with a safety signal; and is intended to provide a simple, durable and reliable device of this kind adapted to be permanently secured to each wheel so as to give indication of under-inflation of the tire of such marked visibility as to make the signal visually effective at a distance without close inspection or reading of a finely marked scale.

Since the great majority of motorists will not take the trouble to remove the dust caps of each tire and apply a pressure gauge and thereafter restore the dust cap, some reliable and practical means of giving such a conspicuous indication of under-inflation of the tire is of great practical importance in view of the great vogue of balloon tires, that is tires of low pressure and thin flexible walls. Such tires are very injuriously affected by under-inflation even to a comparatively small degree.

Still another object of the present invention is the provision of a safety wheel of the character described which is light in weight, simple in construction, reliable in operation, and which can be used in place of the usual type of wheel without changing the construction of the axle, brake drum and the like to which an ordinary wheel has been hitherto attached.

Further objects of the instant invention reside in any novel feature of construction or operation or novel combination of parts present in the embodiment of the invention described and shown in the accompanying drawing whether within or without the scope of the appended claims and irrespective of other specific statements as to the scope of the invention contained herein.

In the drawing:

Figure 1 is an inside plan view of a preferred embodiment of my invention; and

Figure 2 is a sectional view on the line 2—2 of Figure 1.

Similar numerals refer to similar parts throughout the several views.

In the drawing, the numeral 1 denotes a wheel of the usual type to the main rim 5 of which any kind of pneumatic tire 2 and an air tube 3 are attached in a well known manner. The wheel 1 is secured to the brake drum 4 (indicated in dash-and-dotted lines in Fig. 2) in the usual manner.

A secondary rim 6 is secured to the inner side of wheel 1. The term "inner side" designates in this specification that side of the wheel which is directed toward the brake and axis of the wheel. Rim 6 is secured preferably to the wheel 1 by means of screws or in any other suitable manner. A solid tire 7, preferably a solid rubber tire, is attached to rim 6, and at least one pin 8 of conductive material extends radially through the solid rubber tire 7 and through rim 6, as may be seen in Fig. 2. A ring 9 of insulating material is attached to the rotating brake drum 4, which can be done simply by driving ring 9, whose inner diameter is practically as large as the outer diameter of drum 4, upon drum 4. A ring 10 of conductive material is carried by the insulating ring 9. The distance between the inner extremity of pin 8 and the outer periphery of ring 10 is so small (Fig. 2) that conductive pin 8 will touch the ring 10 when tire 7 is slightly compressed. This occurs if the air presure in tube 3 is diminished so that the wheel rolls on tire 7 whose outer diameter normally is slightly smaller than the outer diameter of tire 2. Thus as long as there is sufficient air pressure in the tube 3, the wheel will roll on the pneumatic tire 2, and the pin 8 is in spaced relation to ring 10. But when an under inflation of tire 2 occurs, the wheel will roll on tire 6, and pin 8 will touch ring 10 whenever pin 8 touches the ground. A resilient contact 11 carried by a piece of insulating material 12, which is secured to a stationary not rotating part 14 (Fig. 2) of the brake mechanism, slides on one side of the conductive ring 10 and is connected to a source of current 15 and to an electrical signal device 16 by means of wires 17 and 18 respectively. The signal device 16, which may be an optical signal (lamp or the like) or sound signal, is preferably installed at the dash board near the driver's seat, and one of its terminals is grounded as indicated in the wiring diagram in Fig. 2. Pin 8 is conductive connected to rim 6 by means of a flexible wire 19, and rim 6 is also grounded, so that an electrical circuit will be closed whenever pin 8 touches ring 10. In this way the signal 16 will be actuated, when tire 2 is under inflated, whenever pin 8 touches the ground so that tire 7 is compressed. In order to prevent access of dust and dirt to contact 11, ring 10 and the inner extremity of pin 8, I prefer to make the insulating piece 12 ring-shaped, as shown in the drawing, and to attach a ring-shaped piece 20 of sheet metal or the like to the inner side of rim 6. The inner diameter of piece 20 is only slightly larger than the outer diameter of piece 12, so that the parts 10, 11, etc. are practically completely enclosed and that the operativeness of the device cannot be impaired by dust, and dirt and the like.

The presence of the solid tire 7 and the rim 6 will also facilitate the lifting of wheel 1, which can be done by placing a wedge 21 (Fig. 1) under tire 7, and wheel 1 will be lifted from the ground as indicated in dash-and-dotted lines in Fig. 1. This will make it unnecessary to lift a wheel by means of a jack in the hitherto usual cumbersome manner.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the following claim.

Having thus described my invention, what I claim and desire to secure by Letters Patent in the United States is:

A safety wheel comprising a wheel having a pneumatic tire attached to the main rim of the wheel, a solid rubber tire whose outer diameter is smaller than that of said pneumatic tire and which is attached to a secondary rim secured to the inner side of said wheel, a ring of conductive material attached to a ring of insulating material which is carried by the rotating brake drum to which the wheel is secured, a resilient contact adapted to slide on said conductive ring and being secured to a piece of insulating material which is carried by a non-rotating part of the brake mechanism, at least one pin of conductive material radially extended through said solid rubber tire and through said secondary rim and having one of its extremities normally slightly spaced apart from the outer periphery of said conductive ring, and an electrical signal device one terminal of which is connected to said resilient contact and which is adapted to be actuated whenever said pin touches said conductive ring, said pin and one terminal of said signal device being grounded, all substantially as described.

ALEX PARK MacDICKEN.